(12) United States Patent
Jung et al.

(10) Patent No.: US 7,123,788 B2
(45) Date of Patent: Oct. 17, 2006

(54) APPARATUS FOR MONITORING OPTICAL FREQUENCIES OF WDM SIGNALS

(75) Inventors: Yeun Chol Jung, Daejon (KR); Cheon Joo Yoon, Daejon (KR); Seung Gyun Shin, Seoul (KR); Keun Joo Park, Jeollanam-Do (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 0 days.

(21) Appl. No.: 10/139,469

(22) Filed: May 6, 2002

(65) Prior Publication Data

US 2003/0206689 A1 Nov. 6, 2003

(51) Int. Cl.
*G02B 6/28* (2006.01)

(52) U.S. Cl. .......................... 385/24; 359/182

(58) Field of Classification Search .................. 385/15, 385/24, 32, 100, 147
See application file for complete search history.

(56) References Cited

U.S. PATENT DOCUMENTS

| | | | | |
|---|---|---|---|---|
| 4,523,291 A | * | 6/1985 | Giubbolini et al. | 708/309 |
| 5,010,346 A | * | 4/1991 | Hamilton et al. | 341/137 |
| 5,034,911 A | * | 7/1991 | Rachels | 708/403 |
| 5,450,223 A | * | 9/1995 | Wagner et al. | 398/121 |
| 5,646,623 A | * | 7/1997 | Walters et al. | 342/129 |
| 5,995,258 A | * | 11/1999 | Weber et al. | 359/133 |
| 6,100,831 A | * | 8/2000 | Frankel | 341/137 |
| 6,546,099 B1 | * | 4/2003 | Janse | 379/406.01 |
| 2001/0037068 A1 | * | 11/2001 | Goto et al. | 600/485 |
| 2002/0123851 A1 | * | 9/2002 | Kurooka et al. | 702/69 |
| 2002/0126958 A1 | * | 9/2002 | Maigne et al. | 385/48 |
| 2002/0141693 A1 | * | 10/2002 | Whiteaway et al. | 385/24 |
| 2002/0154372 A1 | * | 10/2002 | Chung et al. | 359/182 |
| 2003/0152140 A1 | * | 8/2003 | Antoniak | 375/219 |
| 2003/0152393 A1 | * | 8/2003 | Khoury | 398/207 |

\* cited by examiner

*Primary Examiner*—Sung Pak
*Assistant Examiner*—Tina M. Wong
(74) *Attorney, Agent, or Firm*—Harness, Dickey & Pierce, PLC

(57) ABSTRACT

The present invention relates to a wavelength division multiplexed (WDM) apparatus for monitoring optical frequencies, allowing optical channel frequency monitoring using the crossover property of an arrayed-waveguide grating and pilot tones that are in wide use in optical communication networks and enhancing efficiency of operation, maintenance, and management of WDM optical communication networks.

The present invention provides a WDM apparatus for monitoring optical frequencies comprising optical demultiplexing means for optically demultiplexing optical signals including externally added pilot tone signals, photo-detecting means for photo-electrically converting the output of said optical demultiplexing means, and frequency estimating means for estimating the frequency of the optical signals by measuring the amplitudes of the pilot tones from the output of said photo-detecting means.

7 Claims, 5 Drawing Sheets

APPARATUS FOR MONITORING OPTICAL FREQUENCIES OF WDM SIGNALS

BACKGROUND OF THE INVENTION

1. Field of the Invention

The present invention relates to an apparatus for monitoring optical frequencies using an arrayed-waveguide grating (demultiplexer) in wavelength division multiplexed optical communication networks. More particularly, the invention relates to a wavelength division multiplexed apparatus for monitoring the optical frequencies utilizing an arrayed-wavequide grating and pilot tone signals applied on optical signals in order to enhance the efficiency of operation, administration, and maintenance of wavelength division multiplexed optical communication networks.

In Wavelength Division Multiplexing (WDM) optical communication systems, a plurality of transmission lasers with different wavelengths are multiplexed on a single optical fiber so that the transmission capacity per fiber is enhanced, endowing the network with broadband and high speed.

However, since the optical frequencies of optical signals may change due to the system aging, temperature change, etc. and the optical frequency change on each channel may have a large impact on the system performance by causing a change in channel output power and crosstalk with the adjacent channels due to the different frequency-dependent transmission properties of different optical elements, there is always needed to monitor optical frequencies of each channel in wavelength division multiplexed systems.

2. Description of the Related Art

There has been proposed a technique in the prior art for monitoring optical frequencies of multiple channels in which the wavelength crossover properties of an arrayed-waveguide grating is utilized to monitor optical frequency of optical signals by passing the optical signals through the arrayed-wavequide grating.

However, this technique in the prior art has an economic disadvantage that two arrayed-waveguide grating ports and two photodetectors are required to monitor one optical signal because two optical signals carried on one port of the arrayed-waveguide grating cannot be differentiated.

Another frequency monitoring technique in the prior art applicable to wavelength division multiplexed optical transmission systems uses frequency tunable passband filters such as acousto-optic tunable filters or temperature tunable etalon filters that are able to vary the frequency of the passband.

However, this technique not only requires a delicate tuning mechanism though they allow a simple configuration, but has insufficient reliability and resolution for dense WDM optical systems.

There has been proposed still another simple technique which uses a fixed Fabry-Perot etalon filter and pilot tones for monitoring optical frequencies of multiple channels without using tunable filters and monitors the optical frequencies of the optical signals falling in the vicinity of the resonance frequency of the Fabry-Perot etalon filter.

However, this technique has a disadvantageous degradation in the monitoring performance after passing an optical amplifier due to the cross-gain modulation of erbium-doped optical fiber amplifier (EDFA).

SUMMARY OF THE INVENTION

The present invention is to resolve the aforementioned problems in the prior art. It is an object of the present invention to provide a WDM apparatus for monitoring optical frequencies of WDM channels using both the wavelength crossover properties of an arrayed-waveguide grating and pilot tones that have widely been used to monitor whether optical signals exist and how large the signal amplitudes are in WDM optical communication networks, enhancing the efficiency in operation, management, and maintenance of optical communication networks.

To achieve the above object, there is provided an apparatus for monitoring the optical frequencies comprised of optical demultiplexing means for optically demultiplexing optical signals including externally added pilot tones, photo-detecting means for photo-electrically converting the output of said optical demultiplexing means, and optical frequency estimating means for estimating the optical frequency of optical signals by measuring the amplitude of the pilot tones from the output of said photo-detecting means.

Preferably, said frequency estimating means further comprise a plurality of electrical filtering means for filtering the output signals of said photo-detecting means so as to output only the signal components over at the pilot tone frequencies, an amplitude detector for detecting the amplitudes of pilot tones from said electrical filtering means, and an optical frequency processor for estimating the optical frequency using the measured amplitudes of pilot tones.

The above and other features and advantages of the present invention will be more clearly understood for those skilled in the art from the following detailed description taken in conjunction with the accompanying drawings, which form a part of this disclosure.

DETAILED DESCRIPTION OF THE EMBODIMENT

Hereinafter, the constitution and operation of the present invention is described in detail through preferred embodiments by referring to the accompanying drawings.

Figure 1:
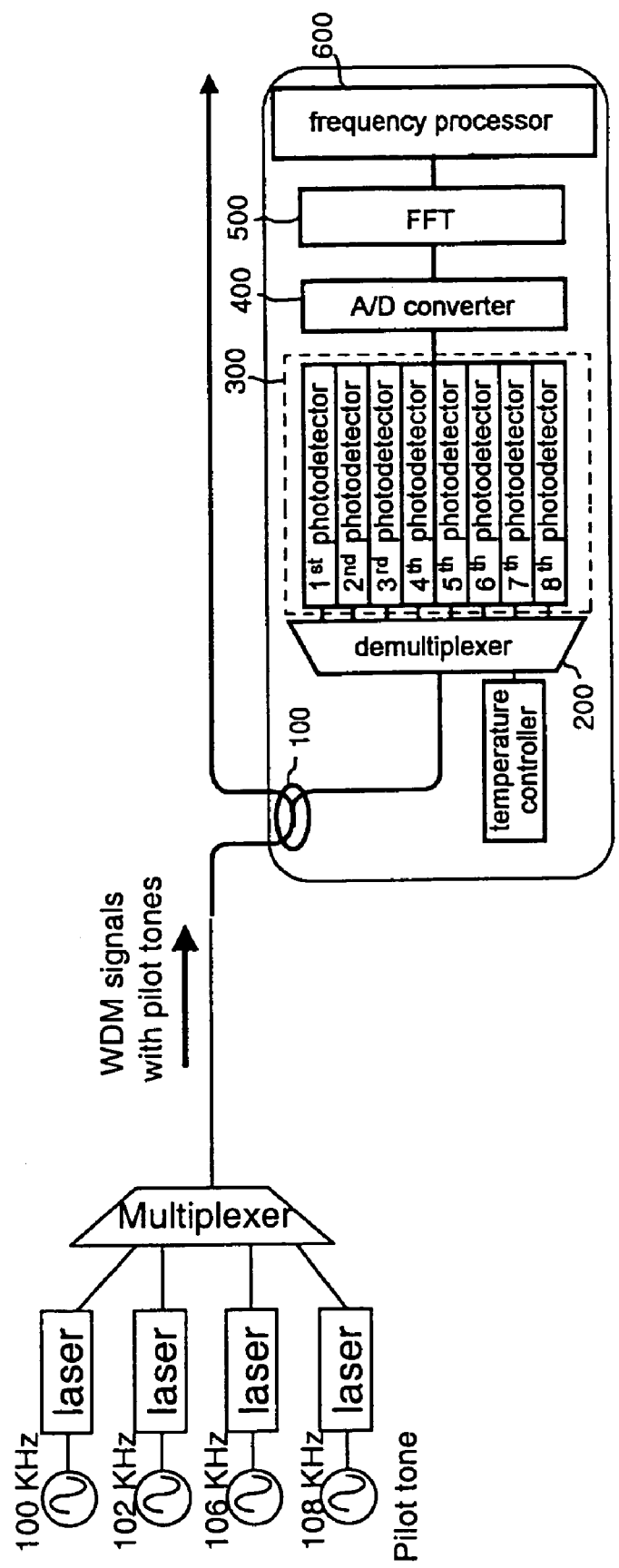
FIG. 1 is a configuration diagram of an apparatus for monitoring optical frequencies using an arrayed-waveguide grating in accordance with an embodiment of the present invention.

FIG. 1 is a configuration diagram of an apparatus for monitoring optical frequencies using an arrayed-waveguide grating in accordance with an embodiment of the present invention.

As shown in FIG. 1, the apparatus for monitoring optical frequencies using an arrayed-waveguide grating in accordance with an embodiment of the present invention comprises a star coupler (100) for sampling optical signals including externally added pilot tones from the optical path, a demultiplexer (or an arrayed-waveguide grating) (200) for demultiplexing the optical signals input from said star coupler (100), a plurality of photodetectors (300) for measuring the amplitudes of optical signals from said demultiplexer (200), an analog-to-digital (A/D) converter (400) for converting the analog signals from said photo-detectors (300) into digital signals, a Fast Fourier Transform (FFT) for fast-Fourier-transforming the digital signals from said A/D converter (400), and an optical frequency processor (600) for estimating the optical frequencies by calculating the ratio of amplitudes of pilot tones from the Fourier-transformed signals by said FFT (500).

Said star coupler (100), connected to the optical path, samples a small portion of the WDM signals including the pilot tone signals that are externally added.

Here, said star coupler, connected to the optical path, samples 1% of the WDM signals while leaves 99% of the signals to pass through.

Said demultiplexer (200) demultiplexes the WDM signals operating at each crossover point.

Said demultiplexer (200) can be constituted by an arrayed-waveguide grating or a Mach-Zender interferometer whereby the transmission has the crossover properties over the optical frequencies.

Likewise, said demultiplexer (200) can be constituted by optical couplers and band pass filters whereby the transmission has the crossover properties over the optical frequencies.

Likewise, said demultiplexer (200) can be constituted by optical couplers and solid Fabry-Perot etalon filters or optical fiber Fabry-Perot etalon filters whereby the transmission has the crossover properties over the optical frequencies.

Likewise, said demultiplexer (200) can be constituted by optical circulators and optical fiber grating filters whereby the transmission has the crossover properties over the optical frequencies.

The channel spacing of the WDM signals of said demultiplexer (200) is made equal to the channel spacing of the arrayed-waveguide grating or a multiple of the same.

Photo-detectors, attached at each port of the arrayed-waveguide grating, i.e., demultiplexer (200), produces electric signals of the pilot tones in proportion to the input optical signal amplitudes.

Said A/D converter (400) receives analog electric signals and converts those into digital signal outputs.

Said FFT (500) performs fast-Fourier-transform on the input digital signals and outputs the corresponding amplitudes at the frequencies of the pilot tones.

Said optical frequency processor (600) receives the tone amplitudes at the pilot tones frequencies and estimates the frequencies of WDM optical signals by using the ratio or the difference of the amplitudes of the pilot tones.

Figure 2:
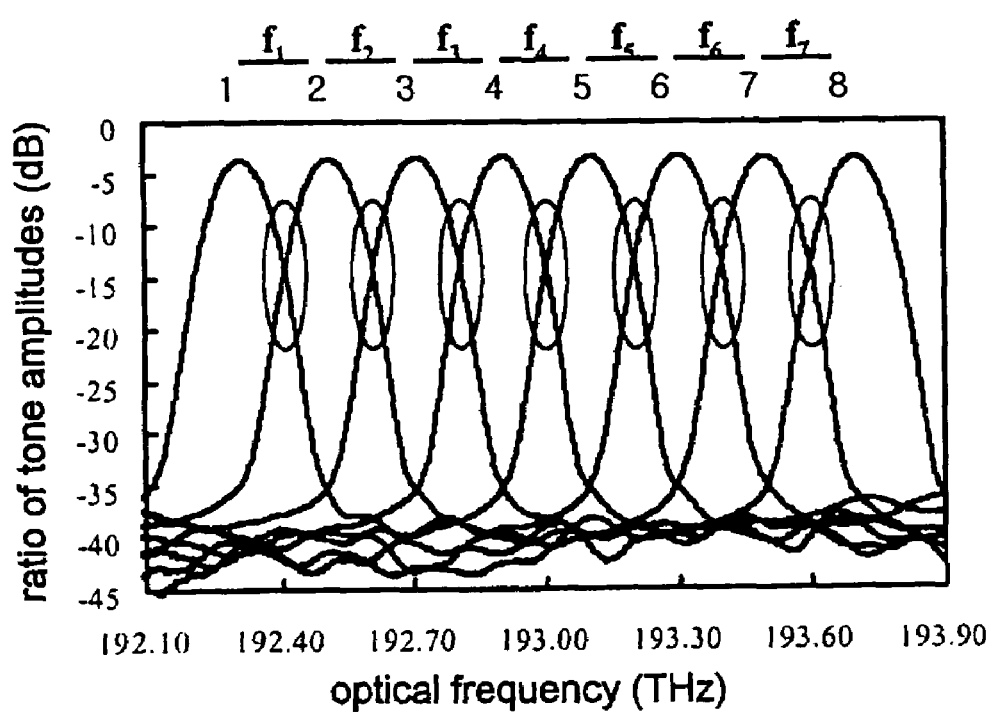
FIG. 2 shows the transmission characteristics of an arrayed-waveguide grating in accordance with an embodiment of the present invention.

FIG. 2 shows transmission characteristics of an arrayed-waveguide grating with channel spacing of 200 GHz and crosstalk of 30 dB for a case of an embodiment in accordance with the present invention.

Since the transmission characteristics of the arrayed-waveguide grating changes over the frequency depending on the temperature, a thermoelectric cooler and a thermistor are used for temperature control so as to anchor the crossover frequencies of the arrayed waveguide grating to the standardized frequencies of WDM optical signals.

In other words, the WDM optical signals operate at the vicinity of each crossover points of the arrayed-waveguide grating.

In FIG. 2, numerals shown above the characteristic figure represent the port numbers of the arrayed-waveguide grating, and f1 through f7 represent pilot tone frequencies ranging low frequencies of several hundreds kHz that are applied to each optical signals.

Therefore, when optical signals change in their frequencies, the optical signal passed through an arrayed-waveguide grating will change depending on the transmission characteristics of the arrayed-waveguide grating.

Figure 3:
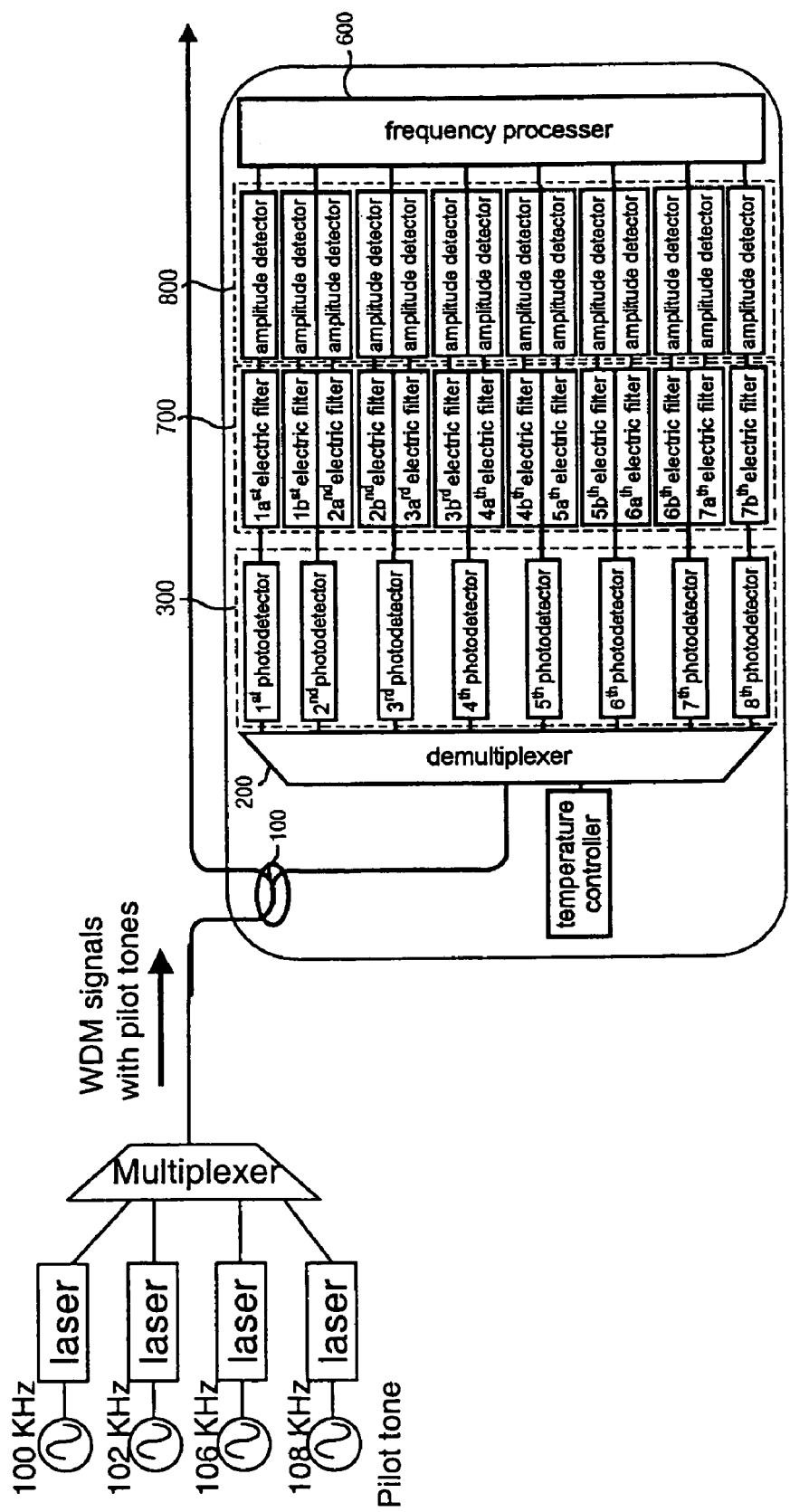
FIG. 3 is a configuration diagram of an apparatus for monitoring optical frequencies using an arrayed-waveguide grating in accordance with an alternative embodiment of the present invention.

FIG. 3 is a configuration diagram of an apparatus for monitoring optical frequencies using an arrayed-waveguide grating (demultiplexer) in accordance with an alternative embodiment of the present invention.

As shown in FIG. 3, the apparatus for monitoring optical frequencies using an arrayed-waveguide grating (demultiplexer) in accordance with an alternative embodiment of the present invention, comprises a star coupler (100) for sampling optical signals including externally added pilot tones from the optical paths, an arrayed-wave guide grating, i.e., a demultiplexer (200), for demultiplexing the optical signals inputted from said star coupler (100), a plurality of photo-detectors (300) for measuring amplitudes of the optical signals from said demultiplexer (200), a plurality of electric filters (700) for extracting components corresponding to only the pilot tone frequencies that have passed through said photodetectors (300), a plurality of amplitude detectors (800) for measuring the pilot tone amplitudes from the signals that have passed said electric filters (700), and an optical frequency processor (600) for estimating the optical frequencies by using the measured pilot tone amplitudes.

Now, the operation of the apparatus for monitoring optical frequencies using an arrayed-waveguide grating in accordance with an alternative embodiment of the present invention is described in detail in the following.

In the alternative embodiment of the apparatus for monitoring optical frequencies using an arrayed waveguide grating, descriptions for the operations of a star coupler (100) for sampling optical signals including externally added pilot tone from the optical path, an arrayed-waveguide grating, i.e., a demultiplexer (200), for demultiplexing the optical signals from said star coupler (100), and photodetectors (300) for measuring the amplitudes of optical signals from said demultiplexer (200) are the same as for FIG. 1.

The electric filters (700) perform filtering on output signals of said photodetectors (300) and pass only the pilot tones corresponding to each channel. The amplitude detectors (800) measure the pilot tone amplitudes from the output signals of said plurality of electric filters (700) and out put the measured results. The optical frequency processor (600) evaluates the optical frequency by using the measured pilot tone amplitudes and outputs the evaluated results.

Here, the optical frequency processor (600) receives the pilot tone amplitudes at the tone frequencies and estimates the frequency of WDM optical signals by using the ratio of pilot tone amplitudes or the difference between pilot tone amplitudes.

Figure 4:
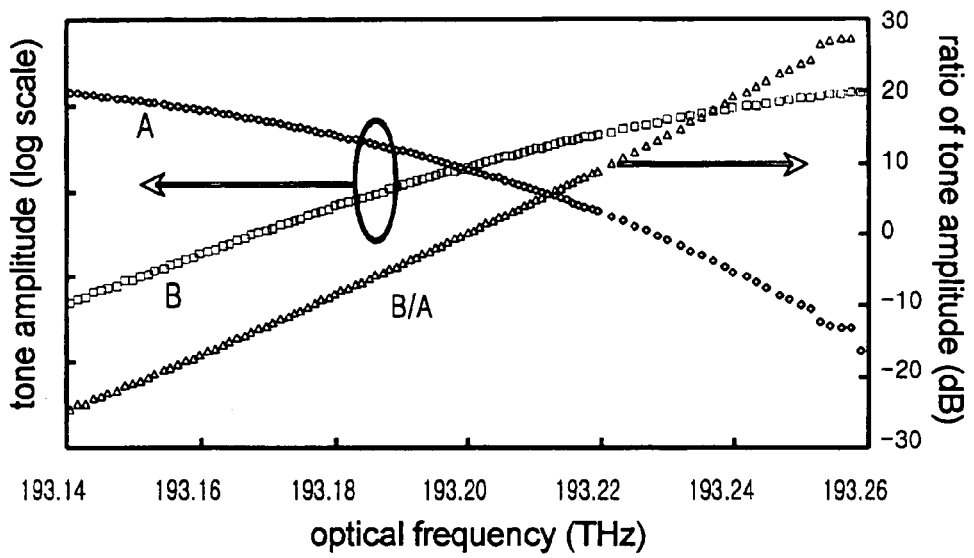
FIG. 4 illustrates the amplitude and ratio of pilot tones against the frequencies of an optical signals passed through an arrayed-waveguide grating in accordance with the present invention.

FIG. 4 illustrates the amplitudes of pilot tones and the ratio against the optical frequency of an optical signal that have passed an 1×8 arrayed-waveguide grating and photodetectors used in the present invention.

In FIG. 4, when the frequency of optical signals applied with pilot tones, which are usually operated around 193.2 THz shown as f5 in FIG. 2, is varied from 193.14 THz to 193.26 THz, it shows the amplitudes of pilot tones and their ratio measured at the fifth port (A) and the sixth port (B) of an arrayed-wavequide grating.

Since, as the optical frequency changes, the amplitude of optical signals passed through an arrayed-waveguide grating changes depending on the transmission characteristics of the arrayed-waveguide grating, and the pilot tone amplitude that is proportional to the optical signal amplitude also changes depending on the same transmission characteristics.

Since WDM optical signals usually operate around crossover frequencies of the arrayed-waveguide grating, each photodetector attached at the output of the arrayed-waveguide grating detects two components of pilot tones Operating at two distinct tone frequencies.

For example of FIG. 2, the fifth photodetector attached at the fifth port of the arrayed-waveguide grating detects the amplitudes of pilot tones at the frequencies of f4 and f5, and the sixth photodetector attached at the fifth port detects the amplitudes of pilot tones at the frequencies of f5 and f6. Therefore, by comparing the amplitudes of tone frequency f5 passed through the fifth port and that passed through the sixth port, the frequency of optical signals (193.2 THz) located at the crossover point between the fifth and sixth ports can be evaluated.

Similarly, the amplitude of tone frequency f4 can be used for evaluating the optical frequency located at the crossover point between the fourth and the fifth ports and the amplitude of tone frequency f6 can be used for evaluating the optical frequency located at the crossover point between the fifth and the sixth ports.

Although two optical signals are inputted into each photodetector (300), since they have different tone frequencies, they can be easily differentiated.

As can be seen in FIG. 4, the ratio of pilot tone amplitudes has one-to-one proportionality against the optical frequency.

Figure 5:
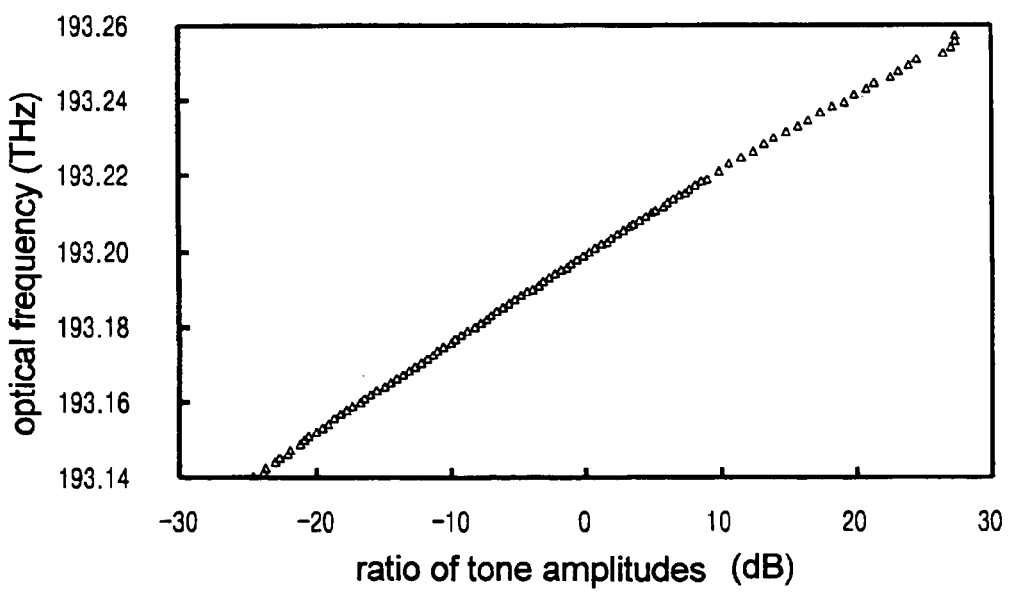
FIG. 5 illustrates an example of the one-to-one proportionality between the ratio of pilot tone amplitudes and the frequency of optical signals, which can be used for estimating the optical frequencies in accordance with the present invention.

FIG. 5 shows an example of frequency monitoring of optical signals operating at the crossover point between the fifth and the sixth ports of the arrayed-waveguide grating of FIG. 2.

With use of FIG. 5 that represents the one-to-one proportionality between the ratio of pilot tone amplitude and the optical frequency, the optical frequency can be determined by measuring the ratio of pilot tone amplitudes of optical signals passed the arrayed-waveguide grating.

Figure 6:
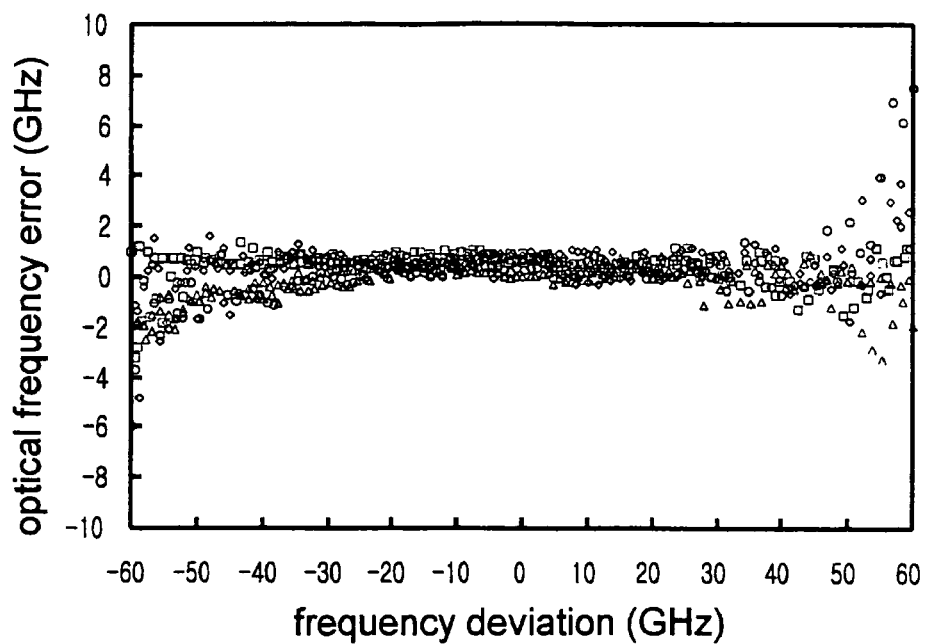
FIG. 6 illustrates a result of the optical frequencies before transmission, monitored in accordance with the present invention.

FIG. 6 illustrates an experimental results of the optical frequencies of seven WDM signals measured before transmission through a single mode optical fiber, representing the errors between optical frequencies measured by monitoring apparatus in accordance with the present invention and by a multi-wavelength meter.

It can be seen in FIG. 6 that, when the channel spacing of WDM optical signals is 200 GHz, the frequency monitoring error is within ±2 GHz over the range of ±50 GHz from the ITU standardized frequency.

Figure 7:
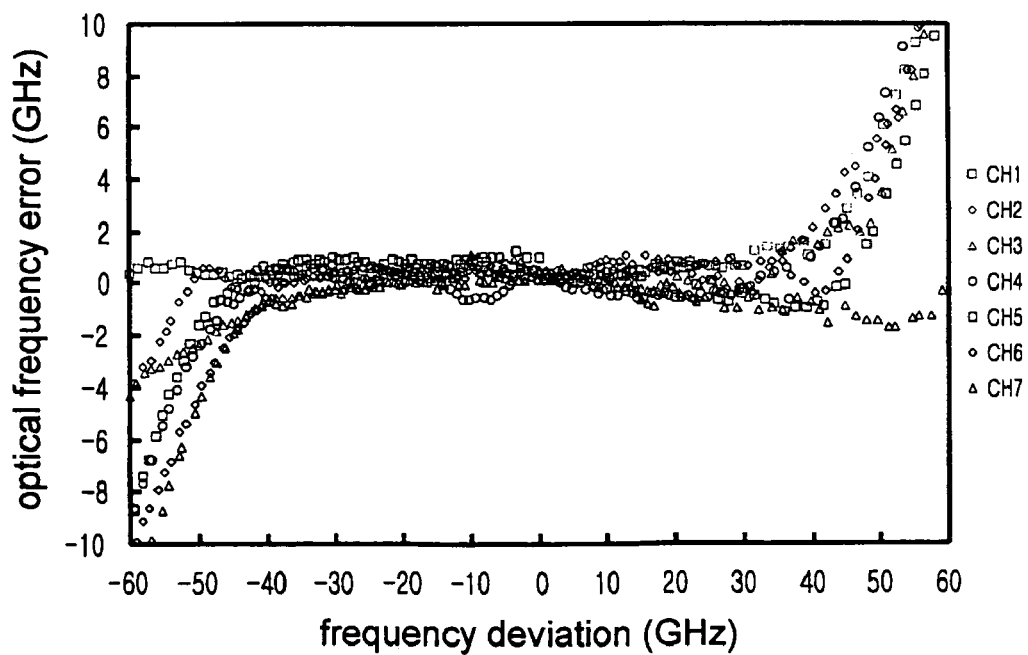
FIG. 7 illustrates a result of the optical frequencies after transmission through a 640-km single mode optical fiber, monitored in accordance with the present invention.

FIG. 7 illustrates an experimental results of the optical frequencies of seven WDM signals measured after transmission through a 640-km long single mode optical fiber, representing the errors between optical frequencies measured by the monitoring apparatus in accordance with the present invention and by a multi-wavelength meter.

It can be seen in FIG. 7 that the frequency monitoring error is within ±2 GHz over the range of ±40 GHz from the ITU standardized frequency. As the optical frequency goes beyond ±40 GHz, the measurement error begins to increase. This is mainly due to the decreased pilot tone amplitude and the effect of ghost tone of the other channel at one photodetector caused by the cross gain modulation of erbium-doped fiber amplifier (EDFA) as optical frequency takes long apart from the ITU standard frequency.

When optical signals including pilot tones pass the erbium-doped fiber amplifier (EDFA), tone frequency components of other optical channels are generated in each channel due to the cross-gain modulation of the EDFA. These generated tone frequency components are called as ghost tone. The ghost tones are uniformly distributed all over the WDM channels.

Therefore, the amplitude of the ghost tones due to the cross-gain modulation of the EDFA is proportional to the number of WDM channels detected at the photodetector. In the prior art using fixed etalon filters and pilot tones, the measurement error of optical frequency increases as the channel number increases, since a single photodetector is used for all WDM channels. However, since each photodetector covers only two channels in the present invention unlike other monitoring techniques using pilot tones, the accuracy of the present invention would not be limited by the number of WDM channels.

If optical frequency exceeds ±40 GHz from the operating frequency, the optical frequency error becomes large due to the effect of ghost tones of adjacent channels. However, as long as WDM channels are operated within ±40 GHz from the ITU standardized frequency the effect of ghost tones is negligible because the amplitude of pilot tones is much larger than that of ghost tones.

As described above, the apparatus of monitoring optical frequencies using the pilot tones and an arrayed-waveguide grating in accordance with the present invention has the effect of not only monitoring simultaneously optical frequencies of WDM channels but also allowing a simple and economic embodiment.

Although the present invention for an apparatus of monitoring optical frequency using an arrayed-waveguide grating and pilot tone has been described along with the accompanying drawings, this only illustrates preferred embodiments but not limits the scope of the present invention. It will be apparent for those skilled in the art that various modifications and imitations may be made without departing from the ideas of the present invention set forth in this disclosure.

What is claimed is:

1. An apparatus for monitoring optical frequencies of wavelength division multiplexed optical signals comprising:

pilot tone signal generating means for dithering the intensity of each optical signal with small amplitude and unique tone frequency in addition to usual large data modulation at the each transmitter;

optical filtering means to split each optical signal including pilot tone signal into two adjacent ports of demultiplexer by configuring the demultiplexer with crossover property and by operating each optical channel at crossover wavelength of demultiplexer;

photo-detecting means for receiving and photo-electrically converting each output signals including two pilot tone signals from said optical filtering means; and optical frequency estimating means for estimating the frequencies of the optical signals by measuring the amplitudes of the pilot tones at the same tone frequency from the two adjacent outputs of said photo-detecting means.

2. The apparatus of claim 1, wherein said optical frequency estimating means further comprising:

analog-to-digital (A/D) converting means for converting the each output analog signals including two pilot tone signals from said each photo-detecting means into digital signals;

fast-Fourier-transforming means for receiving the converted digital signals of two pilot tone signals from said A/D converting means and for estimating the pilot tone amplitudes at the known tone frequencies; and an optical frequency processor for estimating the optical frequencies by comparing the amplitudes of pilot tones at the same tone frequency at two different ports that are outputs from said fast-Fourier-transforming means passed through neighboring two output ports of optical demultiplexer.

3. The apparatus of claim 1, wherein said optical frequency estimating means further comprising:

electric filters for band-passing through only one pilot tone out of two pilot tones with different tone frequency from the each analog output of said photo-detecting means;

amplitude detectors for measuring the only one pilot tone amplitudes from the each output signals from said electric filters; and an optical frequency processor for estimating the optical frequencies by comparing the amplitudes of pilot tones at the same tone frequency from outputs of said neighboring two amplitude detectors.

4. The apparatus of claim 2, wherein said optical frequency processor is characterized to estimate the optical frequencies by using the ratio of measured pilot tone amplitudes at the same tone frequency in neighboring two output ports of optical demultiplexer.

5. The apparatus of claim 3, wherein said optical frequency processor is characterized to estimate the optical frequencies by using the ratio of measured pilot tone amplitudes at the same tone frequency in neighboring two output ports of optical demultiplexer.

6. The apparatus of claim 2, wherein said optical frequency processor is characterized to estimate the optical frequencies by using the difference of measured pilot tone amplitudes at the same tone frequency in neighboring two output ports of optical demultiplexer.

7. The apparatus of claim 3, wherein said optical frequency processor is characterized to estimate the optical frequencies by using the difference of measured pilot tone amplitudes at the same tone frequency in neighboring two output ports of optical demultiplexer.

* * * * *